(12) United States Patent
Ginzburg et al.

(10) Patent No.: US 7,477,627 B2
(45) Date of Patent: Jan. 13, 2009

(54) METHOD AND DEVICE OF ADAPTIVE CONTROL OF DATA RATE, FRAGMENTATION AND REQUEST TO SEND PROTECTION IN WIRELESS NETWORKS

(75) Inventors: Boris Ginzburg, Haifa (IL); Nati Dinur, Omer (IL)

(73) Assignee: Intel Corporation, Santa Clara, CA (US)

( * ) Notice: Subject to any disclaimer, the term of this patent is extended or adjusted under 35 U.S.C. 154(b) by 862 days.

(21) Appl. No.: 10/658,614

(22) Filed: Sep. 10, 2003

(65) Prior Publication Data

US 2005/0053037 A1 Mar. 10, 2005

(51) Int. Cl.
*H04Q 7/00* (2006.01)
(52) U.S. Cl. .................. 370/333; 370/445
(58) Field of Classification Search ............ 370/324, 370/333, 445–461, 332, 462, 465; 455/69, 455/452.2; 714/48, 746, 748, 749, 750, 751
See application file for complete search history.

(56) References Cited

U.S. PATENT DOCUMENTS

| | | | | |
|---|---|---|---|---|
| 5,889,772 | A * | 3/1999 | Fischer et al. | 370/346 |
| 7,154,854 | B1 * | 12/2006 | Zweig et al. | 370/236 |
| 2003/0123406 | A1 * | 7/2003 | Yavuz et al. | 370/333 |
| 2003/0152058 | A1 * | 8/2003 | Cimini et al. | 370/338 |
| 2003/0189906 | A1 * | 10/2003 | Belcea | 370/318 |
| 2004/0001462 | A1 * | 1/2004 | Yavuz et al. | 370/333 |
| 2004/0047324 | A1 * | 3/2004 | Diener | 370/338 |
| 2004/0151122 | A1 * | 8/2004 | Lau et al. | 370/252 |
| 2005/0053037 | A1 | 3/2005 | Ginzburg et al. | |
| 2005/0120242 | A1 * | 6/2005 | Mayer et al. | 713/201 |
| 2005/0122989 | A1 | 6/2005 | Ginzburg et al. | |

OTHER PUBLICATIONS

IEEE Std 802.11b-1999, Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band.

IEEE Std 802.11g-2003, IEEE Standard for Information Technology—Telecommunications and Information exchange between systems—Local and metropolitan area networks—Specific requirements—Part 11: Wireless LAN Medium Access Control (MAC) and Physical Layer (PHY) specifications Amendment 4: Further Higher Data Rate Extension in the 2.4 GHz Band.

(Continued)

*Primary Examiner*—Duc Nguyen
*Assistant Examiner*—Anthony S Addy
(74) *Attorney, Agent, or Firm*—Pearl Cohen Zedek Latzer LLP (57) ABSTRACT

A method and device for adaptive control of transmission parameters such as data rate, fragmentation and request to send protection. Packet error rates for frames transmitted with and without request to send protection are computed and compared to determine whether error rates are attributable to noise or to collision. If error rates are attributable to noise, data rates may be adjusted and fragmentation may be activated. If error rates are attributable to collisions, request to send protection may be activated or adjusted.

9 Claims, 4 Drawing Sheets

OTHER PUBLICATIONS

Daji Qiao and Sunghyun Choi, "Goodput Enhancement of IEEE 802.11a Wireless LAN via Link Adaption", In Proc-IEEE ICC' 2001, Helsinki, Finland, Jun. 2001, pp. 1995-2000.

Jim Geier, "Improving WLAN Performance witth RTS/CTS", http://www.80211-planet.com/tutorials/article.php/1445641, Jun. 15, 2003.

Jim Geier, "Improving WLAN Performance witth Fragmentation", http://www.80211-planet.com/tutorials/article.php/1468331, Jun. 15, 2003.

Jim Geier, "Sizing Up Your WLAN", http://www.80211-planet.com/tutorials/article.php/992011, Jun. 15, 2003.

Matthew S. Gast, "802.11 Wireless Networks" The Definitive Guide, O' Reilly 2002.

Bob O;Hara and Al Petrick, "The IEEE 802.11 Handbook, A Designers Companion" IEEE 1999.

* cited by examiner

METHOD AND DEVICE OF ADAPTIVE CONTROL OF DATA RATE, FRAGMENTATION AND REQUEST TO SEND PROTECTION IN WIRELESS NETWORKS

BACKGROUND OF THE INVENTION

Noise and packet collisions are factors that may reduce the quality of transmissions over a wireless network such as for example a wireless local area network (WLAN). Various measures such as adjustment of data rates, activation of fragmentation and implementation of request-to-send protection may improve transmission quality and reduce the effects of noise and collisions in WLAN or other wireless network transmissions. While these measures may function independently, there is a need to control and adapt these measures to the changing conditions affecting WLAN communications. Furthermore, there is a need to improve quality of transmissions on wireless networks in the face of noise, packet collisions and other factors.

BRIEF DESCRIPTION OF THE DRAWINGS

Embodiments of the invention will be understood and appreciated more fully from the following detailed description taken in conjunction with the drawings in which.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification, discussions utilizing terms such as "processing," "computing," "calculating," "determining," or the like, refer to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices.

The processes and displays presented herein are not inherently related to any particular computer, communication device, article or other apparatus. The desired structure for a variety of these systems will appear from the description below. In addition, embodiments of the present invention are not described with reference to any particular programming language, machine code, etc. It will be appreciated that a variety of programming languages, machine codes, etc. may be used to implement the teachings of the invention as described herein.

As used in this application the following terms may have the following meanings: 'transmission quality' may mean the number of frames that are transmitted over a WLAN or other wireless network, relative to the number of such frames that are acknowledged, through for example an acknowledgment (ACK) response frame, as received by a peer. Transmission (Tx) quality may be expressed as a percentage, such as for example a Packet Error Rate (PER) percentage, which may be, for example, the number of frames for which an ACK acknowledgement frame has not been received, over the number of frames transmitted in a particular period. In some embodiments, a success/fail rate of transmitted frames may be measured or calculated over an interval of, for example, a most recent group of frames that were transmitted, such as for example, the last 100 or 1000 frames transmitted. In other embodiments, a success/fail rate or a PER may be calculated over a given time period. Other measures or periods of calculations may be used. A Tx quality threshold may be a level of Tx quality, below which, some corrective action or adjustment to transmission parameters may be appropriate.

The term 'data rate' may mean for example the rate at which bytes of data are sent over a wireless link or between wireless communication devices. Data rate may be expressed in mega bytes per second (Mbps), or through other units of expression. The term 'fragmentation' may mean for example breaking frames such as for example medium access control service data units (MSDU) into fragments such as for example medium access control protocol data units (MPDU) before transmission of the frame or data unit. Fragmentation may, in some embodiments, effect or improve the reliability or quality of transmissions since for example, smaller frames may have less chance of being interrupted by noise or collisions. The size of fragments may in some embodiments be set from for example, 256 bytes to 2048 bytes per fragment, and the size of fragments may in some embodiments be adjustable by a user or by a WLAN controller or other network controller. Other fragment sizes may be used and other triggers for implementing fragmentation may be used. Fragmentation may in some circumstances not be supported or effective at all possible data rates. For example, fragmentation may provide little appreciable increase in Tx quality when transmitting at a rate of, for example 11 Mbps using the IEEE 802.11b standard published 1999. In some system configurations, the fragmentation of frames may be controlled by a Transmission Scheduler (Tx Scheduler).

The term 'request to send' (RTS) may for example mean an optional feature of the IEEE Std. 802.11 published 1999, and more particularly to the IEEE-802.11a-1999, IEEE-Std. 802.11b-1999, and IEEE-Std 802.11g that instruct a station to refrain from sending a data frame until the station completes a RTS/clear-to-send (CTS) handshake with a peer such as for example an access point. Other systems and other standards may use protocols similar to the RTS/CTS functions. In some systems or standards, CTS may contain a time value that alerts other stations to hold off from accessing the wireless medium while the initiating RTS station transmits its data. In this way, RTS/CTS protection may minimize collisions among frames sent by stations on the same medium. Other implementations and functions of RTS/CTS operations are possible. In some configurations or transmissions, RTS protection may be added to some, all or none of transmitted frames. For example, the size of a frame may be a determining factor in whether RTS protection is added to a frame. For example, if an 'RTS threshold' of 1,000 bytes is implemented, then RTS protection may be applied to frames of 1,000 bytes or more. Transmitting without RTS protection or deactivating RTS protection may be implemented by setting the RTS threshold above the size of most or all of the frames to be transmitted. The term 'data sampling threshold' may mean for example a minimum number of frames that are transmitted and evaluated for success/fail rate or a minimum period of transmission that may be monitored in order to determine a Tx quality. For example, in some embodiments, a determination of Tx quality may be made on the basis of a PER of the last 100 frames or the last 100 milliseconds, if desired. In other embodiments, determination of Tx quality may be made on the basis of a PER of the last 1000 frames and/or the last 1000 milliseconds, if desired. Other limits or measures may be used as a scale or a criteria in designating data sampling thresholds.

The term 'collision rate threshold' may mean for example the success/fail rate of transmitted packets that is attributable to collisions. For example, a collision rate threshold may be set at 15%, to indicate that, no adjustments to request to send protection need be made to correct transmission failure rates where 15% or less of the total failures are attributable to collisions.

The terms 'attributable' or 'due to' may mean for example that a factor such as for example noise, is a factor, though not necessarily the sole or even primary factor that contributes to a condition, such as for example, a high PER. In some embodiments in order to be 'attributable to', it may be sufficient that a factor contributes to a subject condition to the extent that reducing the prevalence of the factor may on the whole improve the subject condition.

Figure 1:
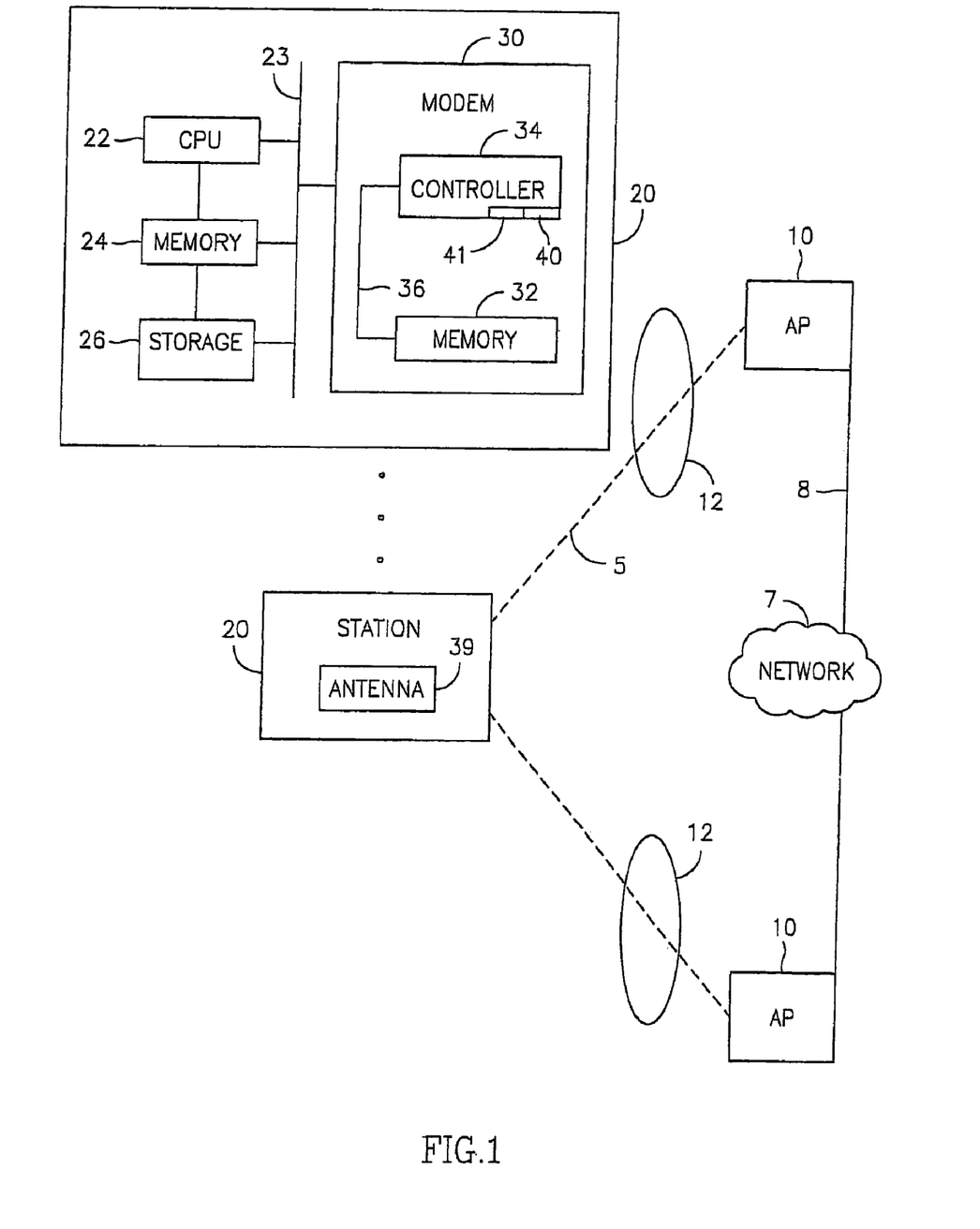
FIG. 1 is a schematic diagram of components of a station and of a network in accordance with an exemplary embodiment of the invention.

FIG. 1 is a schematic diagram of components of a station and of a network in accordance with an exemplary embodiment of the invention. Referring to FIG. 1, network 7 may for example include one or more peers, such as for example other wireless receiving and broadcasting devices, or access points (AP) 10, which may transmit to stations 20. Network 7 may for example be a wireless network or a network that includes wireless components. For example, in some embodiments, network 7 may be a local area network (LAN) with wireless links, such as a WLAN. In other embodiments, network 7 may be for example a wide area network (WAN). Peers or APs 10 may in some embodiments transmit frames to and receive frames from stations 20 or from other equipment such as for example personal computers, workstations, printers, etc. Data communication or traffic 5 between stations 20 and a peer or AP 10 may for example be radio waves carrying digital data In other embodiments, traffic 5 may be in different forms such as infrared or other electromagnetic waves.

Peer or AP 10 may be for example a wireless bi-directional communications link or wireless interface device through which wireless devices such as, for example station 20, may communicate with a network such as network 7. In embodiments of the invention, other communications links, having structures and functionalities other than those of an access point 10 may be used. In some embodiments, peers or APs 10 may be connected to each other or to network 7 or components of network 7 by wired links 8 or wirelessly.

Station 20 may be or include a wireless communication device. For example, station 20 may for example be a personal computer which may for example be portable (e.g., a "laptop") and which may include a wireless modem 30. Such a wireless modem 30 may be, for example, a mini-PCI wireless network adaptor or may be another type of wireless communications device. Station 20 may be other computing devices, such as personal digital assistants, cellular telephones, etc.

Station 20 may include, for example, a controller or processor 22 (e.g., one or more central processing units (CPUs) or microprocessors), a memory or storage unit 24 (e.g., one or more random access memories (RAMs) or read only memories (ROMs) or other storage mediums), mass storage unit 26 (e.g., a hard disk or other non-volatile memory), one or more busses 23, and a wireless modem 30. Wireless modem 30 may include standard computational components, such as, for example, a controller 34, such as a microprocessor, CPU, etc, a memory unit 32, and one or more busses 36. Station 20 may in some embodiments include other components such as for example an antenna 39 such as for example a dipole antenna, an internal antenna, an omni-directional antenna or the like.

Network 7 may in certain embodiments be a WAN such as for example the Internet, a WLAN such as, for example, those that may connect a LAN to wireless stations, or smaller networks such as those used by components based on for example, the Bluetooth standard, such as scatternets, micronets or piconets, etc.

In some embodiments, either or both of processor 22 or controller 34 may act as a controller to carry out all or part of a method according to an embodiment of the present invention. While in FIG. 1 such components are shown in only one station 20, other stations 20 may include similar components. Some stations 20 may include different sets of components and different functionalities, and may carry out the methods discussed herein in different manners. In other embodiments having equipment with different configurations, different components may act as a controller 34. In some embodiments, a peer or AP 10 may also contain a controller 34.

In some embodiments, a controller such as controller 34 may be capable of adjusting the data rate of transmissions made to an AP 10 or to another peer connected to network 7. Controller 34 may likewise be capable of causing or controlling the fragmentation of frames to be transmitted, and may be further capable of implementing RTS protection. Other components of station 20 or AP 10 may alone or in conjunction be capable of adjusting data rates, activating/deactivating fragmentation, implementing RTS protection or performing other adjustments to transmission parameters. Controller 34 may include or be comprised of a comparator 40 that may be capable of collecting and comparing packet error rates, and an adjustor 41 that may be capable of adjusting transmission parameters such as for example data rate, fragmentation or request to send protection.

Figure 2:
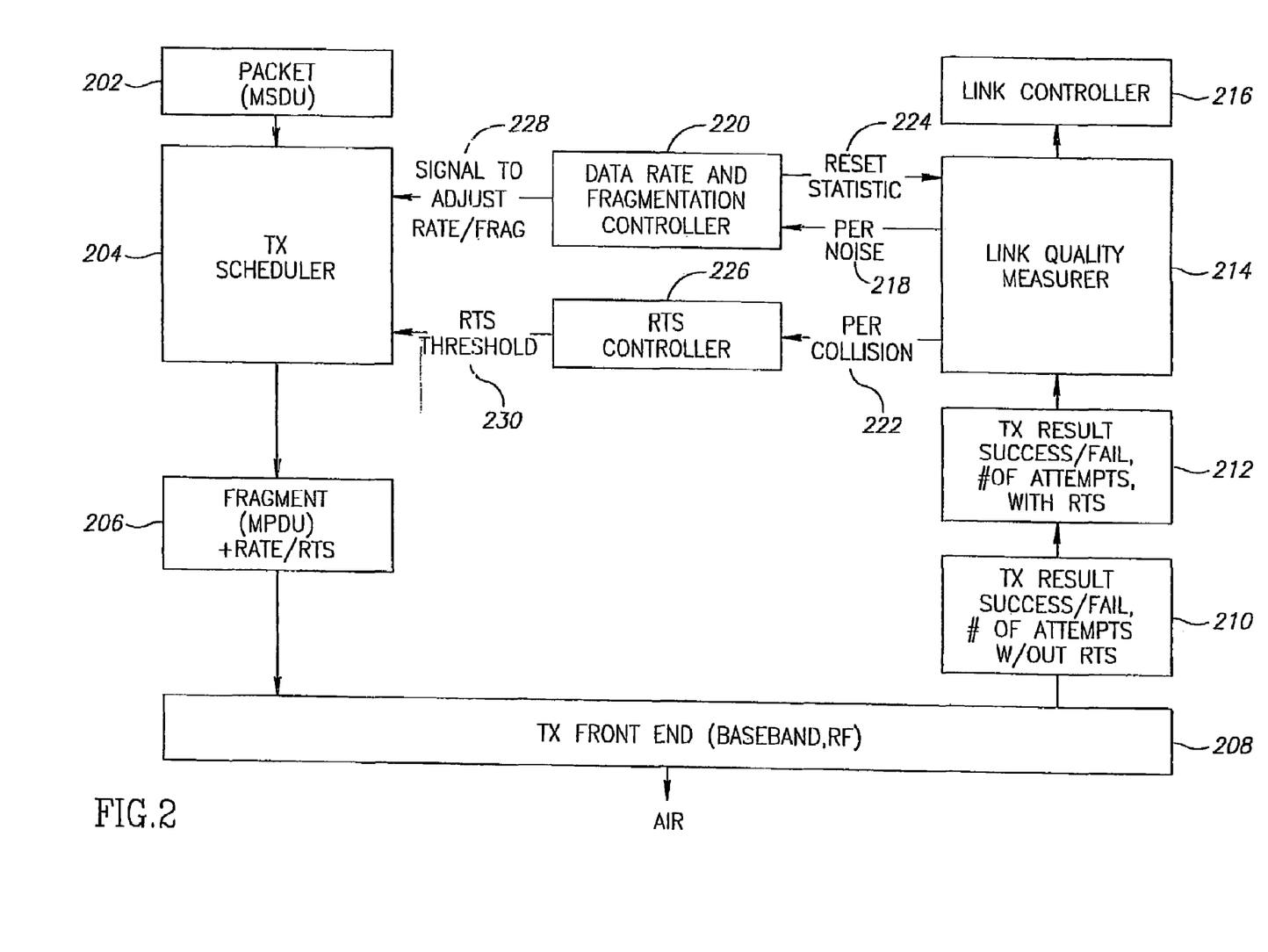
FIG. 2 is a schematic diagram of a system architecture including data flows in accordance with an exemplary embodiment of the invention.

Reference is made to FIG. 2, a schematic diagram of a system architecture including data flows in accordance with an embodiment of the invention. In some embodiments, such architecture may be included in a controller such as controller 34 of station 20. In some embodiments such architecture may be included in an AP 10 or in both station 20 and AP 10. In FIG. 2, a packet 202 or other data unit that is to be transmitted is passed through a TX scheduler 204. Tx Scheduler 204 may in some embodiments be software, or in some embodiments, a combination hardware (such as for example firmware or other specialized circuits) and software controller that may divide a frame or other data unit into fragments 206, or that may determine a data rate at which a frame may be transmitted. The activation status of fragmentation and the settings of fragment size may in some embodiments be stored in Tx Scheduler 204. Tx front end 208 may be a transmitter, such as for example a baseband or RF transmitter or transmitter and receiver combination that may transmit and or receive frames over a wireless medium. Other front end systems of transmitters may be used. In some embodiments the transmission function of Tx front end 208 may be performed in a separate unit from the receiving function. In some embodiments, Tx front end 208 may be, or may be connected to, antenna 39, for example, as appears in FIG. 1. Tx front end 208 may receive frames, such as for example ACK frames indicating that frames it had transmitted were successfully received by a peer, such as for example, an AP 10.

The number of ACK, or other acknowledgment frames, received by Tx front end 208 may, in some embodiments, be calculated by link quality measurer 214 and may in some embodiments be compared to the number of frames transmitted in order to derive a PER. Link quality measurer 214 may in some embodiments be a software component or a combination of software, hardware and memory. In some embodiments, link quality measurer 214 may include a data structure that collects, calculates and/or conveys statistics such as for example, success/fail rates or PERs, relating to the successes and failures of transmissions sent by or returned to Tx front end 208. In some embodiments link quality measurer 214 may be a part of or included in controller 34. In some embodiments link quality measurer 214 may be part of link controller 216, which may or may not be part of controller 34. In some embodiments, data on for example, frame transmission, Tx quality, or success/fail rates as may be collected in link quality measurer 214 may be further processed by a processor such as for example processor 22 and may be stored in a memory such as memory 32 or memory 22. In some embodiments, data collected in link quality measurer 214 may be calculated separately for frames transmitted with RTS protection 212 and for frames transmitted without RTS protection 210. Other kinds of data may be collected, calculated or stored by link quality measurer 214. Other organizations for modules implementing the various functionalities described above may be used, and the specific modules described herein and their functionalities may be combined or distributed among other modules. Furthermore, various embodiments of the present invention need not implement all of the functionalities described herein.

In some embodiments, the data or statistics collected, calculated or stored in link quality measurer 214 may include for example, data on PER that is attributable to noise (PER noise) 218 or PER that is attributable to collisions (PER collision) 222. Other measures of Tx quality may in some embodiments also be collected by link quality measurer 214 or other components. Data on Tx quality, such as for example, elevated PER noise 218 or PER collision 222, may in some embodiments be converted into instructions or signals that may be transmitted by for example, link quality measurer 214 or another component, to controllers such as for example a data rate and fragmentation controller 220, or an RTS controller 226. In some embodiments, one or both of data rate and fragmentation controller 220 and RTS controller 226 may be included in or be part of controller 34. Data rate and fragmentation controller 220 may for example and in some embodiments accept a signal from link quality measurer 214 and adjust a data rate or activate or deactivate fragmentation, or adjust other transmission parameters in response to such signal. RTS controller 226 may in some embodiments accept a signal from for example, link quality measurer 214 or another component, and activate/deactivate or adjust a threshold of RTS protection. In some embodiments a single controller may control all of data rate, fragmentation, and RTS protection. In some embodiments separate controllers may control data rate, fragmentation, and RTS protection. In some embodiments, data rate and fragmentation controller 220 may deliver a signal 228 to Tx Scheduler 204 or to another controller to adjust data rates or, for example, activate fragmentation. Similarly, RTS controller 226 may in some embodiments deliver a signal 230 to Tx Scheduler 204 or to some other controller to implement RTS protection or adjust RTS thresholds. Tx Scheduler 204 may adjust parameters such as data rate, fragmentation or RTS protection in accordance with such signals and deliver frames to Tx front end 208 in accordance with such adjustments or implementations. In some embodiments, the process described above may be performed on a repeating basis. Transmission parameters other than those described above may also be adjusted.

In an exemplary embodiment of the invention, Tx front end 208 may transmit for example, a series of frames, for some of which an ACK acknowledgement may not have been received, thereby indicating an unsuccessful or failed transmission. A controller or a component of a controller, such as for example link quality measurer 214, may collect or calculate a first success/fail rate or PER for a series of transmissions of frames sent with RTS protection 212 and a second success/fail rate for frames transmitted without RTS protection. In some embodiments, the first PER for transmissions without RTS protection may be compared to the second PER for transmissions with RTS protection. A difference between the two PERs may indicate that the first PER was attributable to collisions. If as a result of such comparison, it is determined that a PER for transmitted frames is high and that such high PER is attributable to PER collisions 222, a controller such as for example link controller 216 by way of link quality measurer 214, may in some embodiments deliver a signal 222 to RTS controller 226 which may in some embodiments deliver a signal to Tx Schedule 204 to adjust transmission parameters. Such adjustments may include for example, implementing RTS protection 226 or adjusting an RTS threshold 230. If as a result of data collected, calculated or stored in link quality measurements 214, it is determined by for example, link controller 216 by way of link quality measurer 214 or some other components that a PER for transmitted flames is high and that such high PER is attributable to PER noise, then link quality measurer 214 or link controller 216 or some other component may deliver a signal 218 to a controller, such as for example data rate and fragment size controller 220, which may in some embodiments deliver a signal 228 to adjust a transmission parameter such as for example data rate or fragmentation. In some embodiments, once such adjustments are made, or each time a transmission parameter is changed, the collected statistics may be sent to memory, and counters or other statistic collectors, such as for example those in or operating with data rate and fragmentation controller 220 or RTS controller 226, may be reset 224 to, for example, zero. Counters or statistics collectors may collect further success/fail rates or PERs or other data and may in some embodiments compare such further rates to those stored in memory. Such comparison may in some embodiments be a basis of a determining whether TX quality has improved as a result of such adjustments, activations and implementations.

Figure 3:
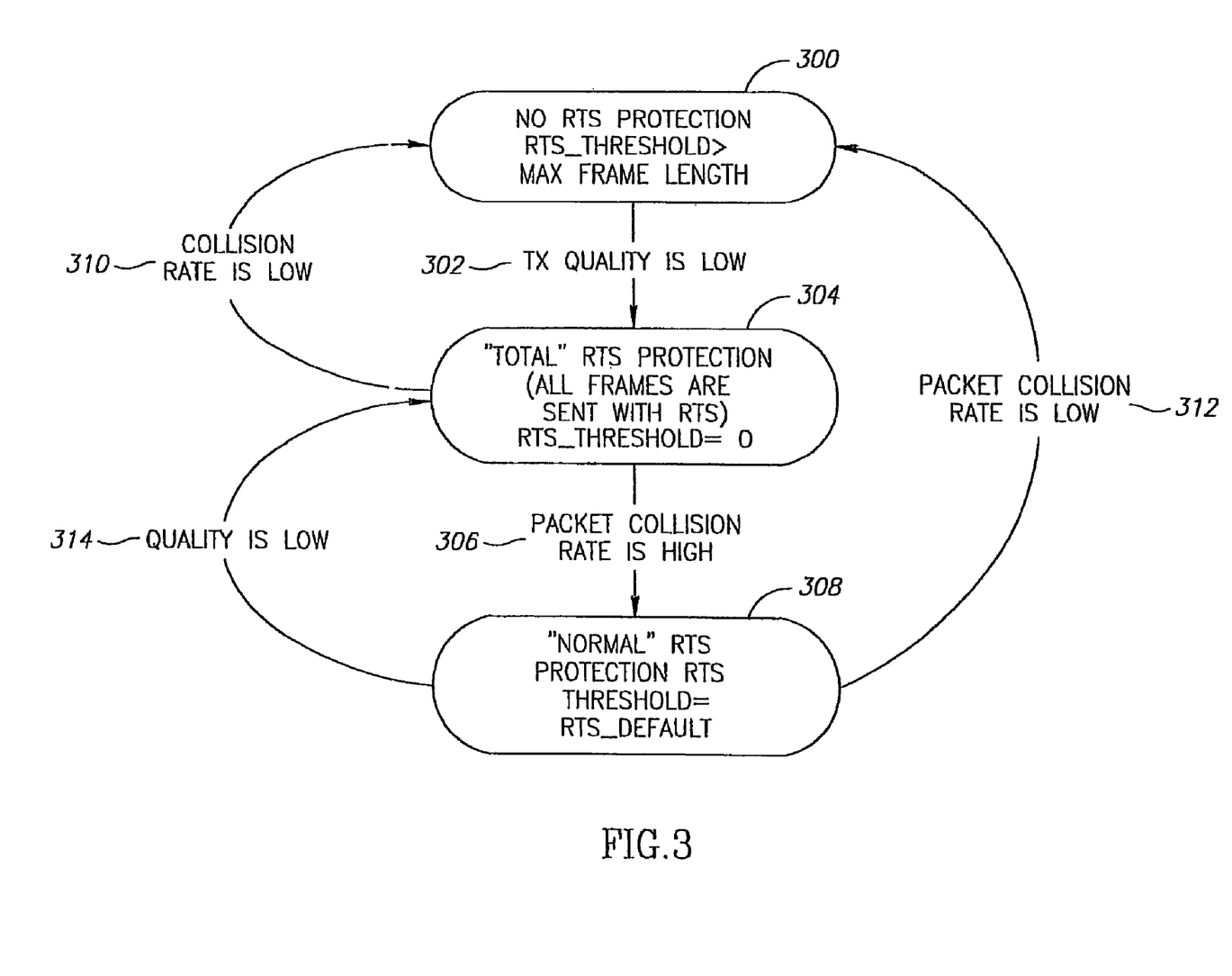
FIG. 3 is a flow diagram depicting a series of operations for adaptive control of data rate, fragmentation and request to send protection in accordance with an exemplary embodiment of the invention.

Reference is made to FIG. 3, a diagram depicting a series of operations for adaptive control of data rate, fragmentation and RTS protection in accordance with an embodiment of the present invention. In an evaluation phase, transmission of frames may be undertaken without RTS protection, as is indicated in operation 300, by, for example, setting an RTS threshold at an elevated level, a mammal level or a predefined upper limit level of RTS protection, such as for example at a number of bytes greater than the maximum number of bytes in a frame length of frames to be transmitted. Other methods of transmitting frames substantially without RTS protection may be used. A sufficient number of frames may be transmitted without RTS protection and monitored for success/failure of such transmissions until a data sampling threshold is reached. If for example, Tx quality is determined to be low 302, as may be evidenced by a high PER, an evaluation of the causes of such low Tx quality may be undertaken by implementing elevated or even total RTS protection 304. Elevated RTS protection or RTS protection at a predefined upper limit implies that an RTS threshold is set near or at 0, such that all or essentially all frames are transmitted with RTS protection. Other methods of implementing elevated RTS protection may be used with elevated RTS protection 304 implemented, a PER or other measure of Tx quality may, in some embodiments, be calculated and compared with a PER collected for transmissions made without RTS protection. If Tx quality is still low, such low Tx quality and high PER may be attributable to noise and not to collisions 310, since a high PER caused by collisions would have been alleviated by the elevated RTS protection. To improve a high PER that is attributable to noise, a data rate may be adjusted and/or fragmentation may be activated to reduce the negative effect of noise on transmitted frames. Similarly, RTS protection may be deactivated since the high PER was attributed to noise and not to collisions.

If problems with Tx quality are not alleviated by adjustments in data rate and activation of fragmentation, such Tx quality problems may be attributable to collisions that occur when elevated RTS is implemented. In some embodiments, at least two sets of PER statistics may be collected and computed for frames sent while RTS protection is implemented. A first PER statistic may be computed for RTS frames themselves (ER of RTS frames), and a second PER statistic may be computed for data frames that are transmitted under RTS protection (PER of data frames with RTS). If PER of RTS frames is high 306, such that it is above a collision rate threshold, it may be assumed that such high PER is attributable to collisions, since the small size of PER frames may make them less sensitive to noise interference. In response, an RTS threshold may be reduced away from elevated protection and towards a more usual or normal RTS protection levels 308 to limit the number frames sent with RTS protection and thereby reduce the number of collisions. The normal RTS threshold may correspond to a pre-determined threshold frame size, for example an RTS threshold of 512 bytes. Other RTS threshold levels may be used. If PER of RTS frames is low 312, it may indicate that the Tx quality problems are attributable to noise and not to collisions. In such case, RTS protection may in some embodiments be deactivated. If at normal RTS protection 308 levels, Tx quality is still low 314, the RTS threshold may be increased to total RTS protection 304 and the process of adjusting data rates, activating fragmentation and implementing RTS protection may be repeated as is described above. If at normal RTS protection 308 levels, it is determined that packet collision rates are low 312, it may be possible to deactivate RTS so that the transmission of frames may be undertaken without RTS protection 300.

A process for adaptive control of data rate, fragmentation, and RTS protection may in some embodiments may be expressed by an exemplary pseudo code as follows:

```
while(1){ /* initiate an infinite loop to indicate that the adaptive
process may be continuous*/
   got TxResponse( rtsTries, rtsSuccess, dataTries,
dataSuccess);/*  define variables to collect statistics on
transmission success rates and PER*/
```

-continued

```
switch ( mode)
   case Rts__Off: //evaluate PER with no RTS protection
      noRtsPacketCounter++;
      update "DataNoRts" statistics;
      compute PER_general; /*compute PER for transmissions made
without RTS protection*/
      if ((PER_general == High) and (noRtsPacketCounter
> noRtsThreshold))
/*If PER is high (and hence Tx quality is low), and the data sampling
threshold has been reached, then activate RTS protection to a maximal
level*/
      {
         mode = RtsOn__All;/*Activate RTS protection at a
         maximal level*/
         /*Reset statistic counters to evaluate PER with RTS
         protection at a maximal level*/
         reset  "Rts"  and  "DataWithRts"
         statistic;
         rtsPacketCounter=0;
         noRtsPacketCounter=0;
      }
      else
/* If PER is low and Tx Quality is good, adjust data rate and
fragmentation as may be possible to further improve Tx quality.*/
      select rate and fragmentation according to
PER_general;
      break;
   case RtsOn__All: // all frames are sent with RTS protection
      rtsPacketCounter++;
      /*collect separate statistics for PER of RTS frames, and for PER
of data frames sent with RTS protection*/
      update "RTS" statistics using RTS frame;
      update "DataWithRts" statistics using data
frame;
      // If a data sampling threshold has been reached
      if (( rtsPacketCounter > RtsIniThreshold)
   {
      compute PER_ofRTSframes;
         compute PER_ofdataframeswithRTS;
      select   rate and fragmentation according to
PER_ofdataframeswithRTS; /*adjust data rate and fragmentation to account
for a PER that is attributable to noise*/
         if ( PER_ofRTSframes; == Low) {
            /*If there are few collisions of RTS frames, turn off
RTS protection, and reset RTS counters*/
            mode = RtsOff;
            noRtsPacketCounter=0;
         }
      else /*If PER_ofRTSframes is high indicating high collision rate,
activate RTS to a 'normal' level*/
         mode = RtsOn__Normal;
         break;
   case RtsOn__Normal:  //only long frames are sent with RTS
      if (frame was long and was sent with RTS
protection)
      {
         rtsPacketCounter++;
         /*collect separate statistics for PER_ofRTSframes, and for
PER_ofdataframessentwithRTS*/
         update "Rts" statistics using RTS frame;
            update "DataWithRts" stat. using data
frame;
         compute PER_ofRTSframes;
         compute PER_dataframeswithRTS;
      }
      else {//Frame was sent without RTS
         noRtsPacketCounter++
         update "DataNoRts" statistics using data
frame;
         compute "PER_general"/*PER for frames sent without
RTS*/;
         /*calculate PER for frames sent without RTS that is attributable
to noise (PER_noisenoRTS) based on PER of RTS frames (PERof_RTSframes)as
calculated above*/
         PER_noiseNoRts = (PER_general − PER_OfRTSFrames)/(1 −
PER_OfRTSFrames);
         /*Select a PER attributable to noise (PER_noise) based on the
greater of the PER attributable to noise for frames transmitted with RTS
protection and the PER attributable to noise without RTS protection*/
```

-continued

```
PER_noise= max (PER_noiseRts , PER_noiseNoRts);
if (noRtsPacketCounter > noRtsThreshold) {
    mode = RtsOn_all;
    rtsPacketCounter=0;
    noRtsPacketCounter=0;
}
}
/*Adjust data rate and fragmentation based on PER_noise*/
select rate according PER_noise;
if (PER_RTSframes is low){
    //Deactivate RTS if PER_ofRTSframes is low
    mode = RTS_Off;
    reset "Rts" and "dataWithRts" statistics;
    PER_noiseRts = 0;
    PER_collision = 0;
}
break;
}
```

Such pseudo code may be expressed in various languages, circuits or firmware structures. Further, other instructions, series of instructions or algorithms may be used, and other embodiments may perform other specific sets of operations and implement other specific algorithms.

A process for determining whether a frame is to be sent with RTS protection may in some embodiments be expressed by an exemplary pseudo code as follows:

```
if ((mode = = RtsAll) OR
    [(mode  ==  RtsOn)  and  (frame  length  >
    Rts_Threshold)] )
        frame is sent with RTS;
```

Such pseudo code may be expressed in various languages, circuits or firmware structures. Further, other instructions, series of instructions or algorithms may be used.

Figure 4:
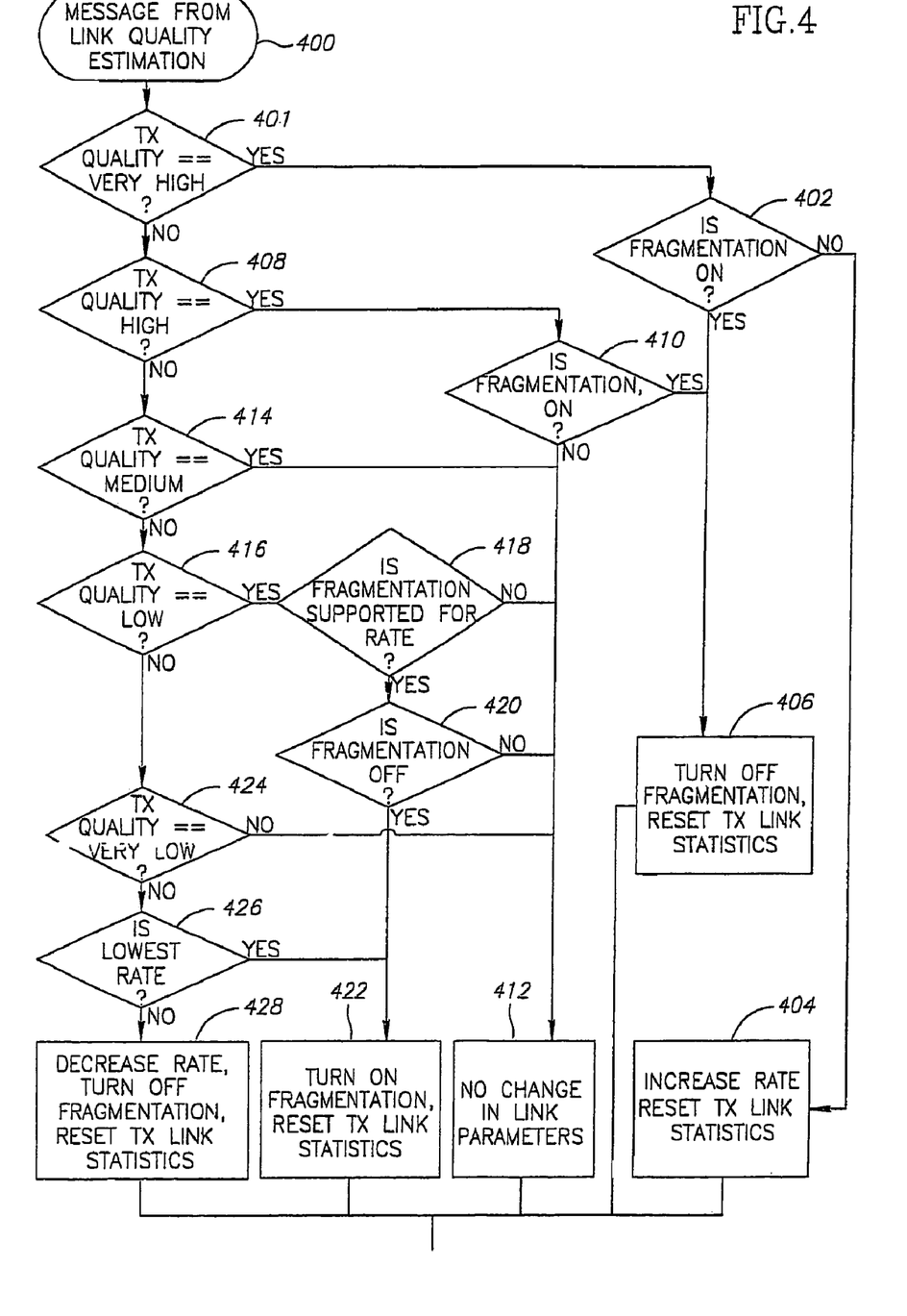
FIG. 4 is a flow diagram depicting operations for adjusting data rate and activating fragmentation in response to transmission quality of a WLAN in accordance with an exemplary embodiment of the invention.

Reference is made to FIG. 4, a flow diagram depicting operations for adjusting data rate and activating fragmentation in response to transmission quality of a WLAN or other network in accordance with an embodiment of the invention. In block 400, link quality measurer 214 may receive or generate a signal estimating Tx quality. Such signal may indicate that Tx quality is very high, indicating a PER of from for example 0% to 10%, high indicating a PER of from for example 10% to 20%, medium indicating a PER of from for example 20% to 40%, low indicating a PER of from for example 40% to 50%, very low indicating a PER of from for example 60% to 80% or lowest indicating a PER of from for example 80% to 100%. Other ranges or grading systems may be used. In block 401, link quality measurer 214 or another component may determine that, for example, a PER for transmitted frames is low and that TX quality is very high. In response and in order to possibly improve Tx quality, data rate and fragmentation controller 220, or some other component such as for example, link controller 216, may in block 402 determine whether fragmentation is activated. If fragmentation is off, a controller such as for example data rate and fragmentation controller 220 may in block 404 increase data rate and reset Tx counters so that new statistics may be collected and may determine if the increased data rate impairs or improves Tx quality. Such determination may, for example, be based on a comparison of PER rates before and after such increase of data rate. If fragmentation is on, a controller such as for example data rate and fragmentation controller 220 may in block 406 deactivate fragmentation and reset counters so that new statistics may be collected to, for example, compare PER or Tx quality before and after such deactivation of fragmentation. In block 408 a component such as for example, link quality measurer 214 may have determined that Tx quality was high. In response and in order to possibly improve Tx quality, data rate and fragmentation controller 220, or some other component such as for example, link controller 216, may in block 410 determine if fragmentation is activated. If fragmentation is off, a controller may in block 412 and in some embodiments of the invention leave data rate and fragmentation parameters at their current settings such that no changes in data rate or fragmentation are made. If fragmentation is on, a controller such as for example data rate and fragmentation controller 220 may in block 406 deactivate fragmentation and reset counters so that new statistics may be collected to determine if deactivating fragmentation effects Tx quality. Some embodiments may not implement a grading system to determine whether Tx quality is high, medium etc.

In block 414 link quality measurer 214, or some other component may determine that Tx quality is medium. In response, a controller may in block 412 leave data rate and fragmentation parameters at their current settings such that no changes in data rate or fragmentation are made.

In block 416 link quality measurer 214, or some other component may determine that Tx quality is low. In response, a controller may in block 418 determine whether fragmentation is supported by a data rate being used for such transmission. If fragmentation is not supported at such data rate, a controller may in block 412 leave data rate and fragmentation parameters at their current settings such that no changes in data rate and fragmentation are made. If fragmentation is supported at a data rate being used for such transmission, and if fragmentation is determined in block 420 to be on, then controller may in block 412 and in some embodiments leave data rate and fragmentation parameters at their current settings such that no changes are made. If fragmentation is supported at a data rate being used for such transmission, and fragmentation is off, a controller such as data rate and fragmentation controller 220 may in block 422 activate fragmentation and reset counters or list statistics so that new statistics can be collected to determine if activating fragmentation improves Tx quality.

In block 424 link quality measurer 214 or some other component may determine that Tx quality is very low, or even at a lowest level, as in operation 426. In response, a controller such as, for example, data rate and fragmentation controller 220 may in block 422 turn on fragmentation and reset counters or list statistics so that new statistics can be collected to determine if such changes improve Tx quality. Alternatively, or in addition, a controller such as, for example, data rate and fragmentation controller 220 may reduce a data rate and deactivate fragmentation. Counters or list statistics may be reset so that new statistics can be collected to determine if such changes improve Tx quality.

Other methods or processes for adjusting data rates and fragmentation settings in order to improve Tx quality may be used.

In some embodiments, more than one data sampling threshold may be used, depending on, for example whether Tx quality is high or low, or whether, for example, Tx quality is improving or worsening. For example, if Tx quality is low, in some embodiments of the invention, a controller may adjust transmission parameters such as data rate or fragmentation based on the success/failure rate of a relatively small number of transmitted frames and a relatively small data sampling threshold. In some embodiments a relatively small data sampling threshold may include a failure of, for example, 30 out of the most recent 100 frames transmitted, or a failure of 10 consecutive frames. Other numbers may be used. If however, Tx quality is high, a relatively large data sampling threshold may be used in calculating a PER and in evaluating Tx quality before adjusting data rate, fragmentation or RTS protection. In some embodiments, adjustments may be made for example on the basis of a small sampling of frames when Tx quality is low, and adjustments may be made for example on the basis of a large sampling of success/fail frames when Tx quality is high. In some embodiments, using different data sampling thresholds may permit relatively rapid adjustments to transmission parameters such as for example data rate and fragmentation that may be needed to remedy a low Tx quality condition that could degrade into a loss of association between a station 20 and a peer such as an AP 10.

It will be appreciated by persons skilled in the art that embodiments of the invention are not limited by what has been particularly shown and described hereinabove. Rather the scope of at least one embodiment of the invention is defined by the claims below.

We claim:

1. A method comprising:
   activating a request to send protection;
   collecting a first statistic of packet error rates for request to send frames sent and a second statistic for packet error rates for data frames transmitted under the request to send protection;
   calculating a first packet error rate of the request to send frames;
   calculating a second packet error rate of data frames sent under the request to send protection;
   reducing a request to send protection threshold if said first packet error rate is above a collision rate threshold; and
   adjusting a transmission parameter according to said second packet error rate if said first packet error rate is below the collision rate threshold.

2. A method as in claim 1, wherein said activating request to send protection comprises setting request to send protection to predefined upper limit.

3. A method as in claim 1, wherein said adjusting a transmission parameter comprises:
   determining whether transmission quality is above a transmission quality threshold;
   and
   increasing a data rate.

4. A method as in claim 3, including:
   determining whether a transmission quality is below a transmission quality threshold;
   and
   decreasing a data rate.

5. A method as in claim 1, wherein said adjusting a transmission parameter comprises adjusting a data rate.

6. A method as in claim 1, wherein said adjusting a transmission parameter comprises adjusting fragmentation.

7. A method as in claim 1, wherein said reducing request to send protection comprises deactivating said request to send protection.

8. A method as in claim 1, further comprising:
   calculating a third packet error rate for data frames sent without request to send protection;
   deriving a fourth packet error rate attributable to noise; and
   adjusting a transmission parameter based on said fourth packet error rate.

9. A method as in claim 8, wherein deriving said fourth packet error rate attributable to noise comprises:
   dividing the result of
      a fifth packet error rate of transmissions without request to send protection minus said first packet error rate of request to send frames, by, one minus said first packet error rate of request to send frames.

* * * * *